Nov. 19, 1935.　　　　S. R. OLDHAM　　　　2,021,196
SPEED REGULATOR
Filed Dec. 30, 1933
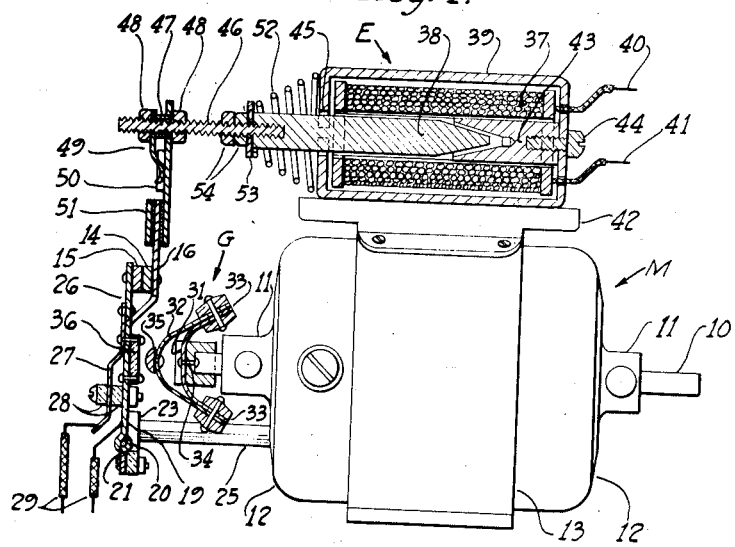
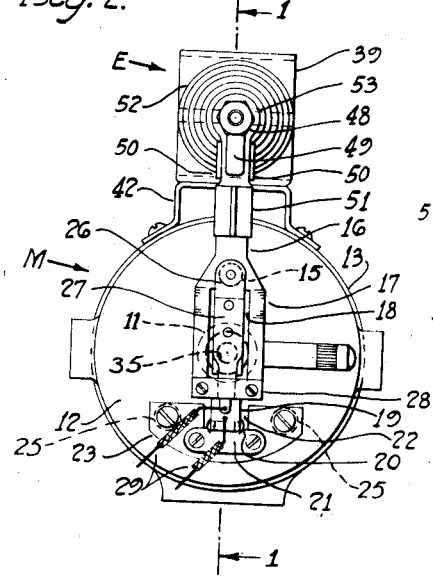
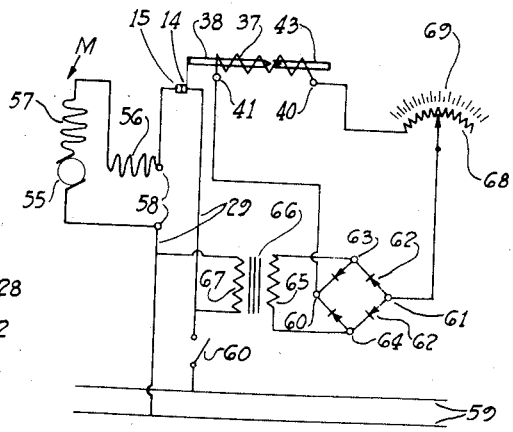
INVENTOR
SAMUEL R. OLDHAM
BY
ATTORNEY Patented Nov. 19, 1935

2,021,196

UNITED STATES PATENT OFFICE 2,021,196

SPEED REGULATOR

Samuel R. Oldham, Elizabeth, N. J., assignor to The Oxweld Railroad Service Company, a corporation of Delaware Application December 30, 1933, Serial No. 704,805

17 Claims. (Cl. 171—222)

My invention relates to speed control regulators, and more especially it concerns an automatic regulatable device for limiting the speed of a machine by a control operative at a distance therefrom. It has special utility for the automatic remote control of electric motors and motor-driven apparatus in general, but is of course not limited in its utility to that field.

Among the more important objects of my invention are:

To provide an improved speed regulator for machines which is simple in construction, and which minimizes frictional wear; to provide an improved speed regulator for machines which can be adjusted and controlled at a distance from a machine; and to provide an improved speed regulator that is adapted to be adjusted and controlled electromagnetically.

The various features of novelty which characterize my invention are pointed out with particularity in the claims annexed to and forming a part of this specification. For a better understanding of my invention, reference may be had to the following description, taken in connection with the accompanying drawing, in which Fig. 1 is a side elevation, partly in section, taken on line 1—1 of Fig. 2, and showing an electric motor controlled by a speed regulator embodying my invention;

Fig. 2 is an end view of the construction shown in Fig. 1; and

Fig. 3 diagrammatically illustrates one manner of connecting the motor and speed regulator shown in Figs. 1 and 2.

Referring to the drawing, I have shown my invention in connection with an electric motor M having a rotatable shaft 10 journaled in bearings 11, the bearings being supported in end heads 12 secured to the ends of the shell 13.

In accordance with my invention the speed of the shaft 10 is controlled by a speed regulator comprising a pair of cooperating contacts 14 and 15. The contact 14 is carried on the upper offset portion 16 of a vertical member 17 having a rectangular opening 18, and a narrow reduced lower portion 19 depending from the opening. The lower portion 19 of the member 17 is pivotally connected at 20 to a bar 21 which extends transversely across a recess 22 formed intermediate the ends of a supporting plate 23. The bar 21 is secured to the supporting plate 23 which in turn is secured to the ends of axially extending rods 25, the opposite ends of which are attached to an end head 12 of the motor M.

The contact 15 is carried on the upper end of a vertical member 26 which is disposed lengthwise of the member 17 at its opening 18, and extends upward adjacent the offset portion 16 thereof. The contact-carrying member 26 is secured to the upper end of a leaf spring 27, the lower end of which is clamped between two bridge blocks 28 mounted on the member 17 below the opening 18. The member 26 is adapted to be axially movable about an axis transverse to the axis of the motor M. The supporting plate 23 and blocks 28 are of suitable material for insulating the members 17 and 26 from each other and from the motor M. A conductor 29 connects the contact-carrying members 17 and 26 in series in an electric circuit associated with the motor M, as hereinafter to be described.

In speed regulators provided with a pair of cooperating contacts connected in series relation in an electric circuit associated with a motor, it is generally the practice to maintain the contacts at a selected, fixed normal position, either closed or open, when the motor is operating at a predetermined speed; and to change the relative position of the contacts from such normal position when the motor exceeds the predetermined speed. At such excessive speeds the opening or closing of the contacts from a previously normally-closed or open position, respectively, changes the conditions within the circuit to reestablish the predetermined rate of speed at which it is desired to operate the motor.

In the preferred embodiment of my invention, the cooperating contacts 14 and 15 are maintained in a normally closed position,—although the invention in its broader aspects is equally adapted for the use of contacts that are normally maintained in an open position.

When the speed of the shaft 10 exceeds a predetermined value, the flexibly or resiliently-mounted contact-carrying member 26 is caused to move axially to separate the contacts 14 and 15. This is accomplished by a centrifugal governor G carried at one end of the shaft 10 and comprising a pair of resilient or flexible metallic strips or leaf springs 31 and 32 connected together at their respective ends. The outer ends of the strips carry weights 33 which are urged outwardly under the action of centrifugal force. The strip 32 is longer than strip 31, so as to maintain the mid-portions thereof in spaced relation, and the construction is such that each spring is bowed in the same direction. The strip 31 is secured at 34 to the end of the shaft 10. The mid-portion of the strip 32 has mounted thereon a button 35 substantially in alignment with the axis of the motor shaft 10. When the weights 33 are forced outward and away from the end shell 12 by the influence of the centrifugal force during operation of the motor M, the member 35 moves axially toward the contact-carrying members 17 and 26 adjacent thereto. Carried by the member 26 at the opening 18 in the member 17 is an insulating strip 36 which is adapted to be contacted by the member 35, when the latter has moved a sufficient distance axially,—thus actuating the member 26, and separating the contacts 14 and 15 from their normally closed position to break the motor-operating circuit. Thus, by regulating the condition of the circuit containing the contacts 14 and 15, the speed of the motor can be controlled to maintain it substantially at a predetermined value.

For adjusting the position of the pivotally-mounted member 17 with respect to the actuating button 35 to regulate the shaft speed at which it is desired to cause the contacts 14 and 15 to separate, I provide an electromagnetic device E comprising a solenoid 37, having therein a movable core or plunger 38 operatively connected with the member 17. Since the distance the plunger 38 moves is relatively short, and a strong magnetic pull is desired, the member 38 is tapered on its inner end to secure greater movement and increase the magnetic pull. The device E is preferably of the "plunger electromagnet" type having an iron housing 39 provided with openings at one end through which the terminals 40 and 41 of the solenoid coil 37 extend. The housing 39 is mounted on a support 42 attached to the top of the motor shell 13. Concentrically disposed within the solenoid coil 37 at one end thereof and spaced therefrom is an immovable iron plug or stop 43, secured by a capscrew 44 to the housing 39, and having an end thereof provided with a conical-shaped recess adapted to receive the conical-shaped free end of the plunger 38. The plunger extends through an opening 45 at an end of the housing 39, and the outer end thereof is recessed to receive one end of a threaded stud 46. The outer end of the stud 46 passes through an opening provided at the upper end of the offset portion 16 of the member 17.

For facilitating longitudinal adjustment of the member 17 with respect to the stud, a sleeve member 47 extends through an opening at the upper end of the member 17, and is freely slidable along the stud 46. The position of the sleeve can be adjusted by lock nuts 48 adapted to bear against each end thereof for limiting the movement of the member 17. A downward-extending spring clip 49, secured on the stud 46 between one end of the sleeve 47 and a lock nut 48, prevents lost motion between members 17 and 46. The lower end of the spring clip pressingly engages one side of the offset portion 16 of the member 17 and urges it toward the inner face of the adjacent lock nut 48. The offset portion 16 of the member 17 is provided with flanged edges 50, to prevent lateral movement of the spring 49.

In addition to the insulation of the contact-carrying members 17 and 26 at the supporting plate 23 and clamping blocks 28, previously described, the member 17 is insulated from the electromagnetic device E by insulation 51 located between the stud 46 and contact 14.

The solenoid 37 is adapted to be energized by connecting its terminals 40 and 41 to a suitable source of electric current, whereupon a magnetic flux is produced which forces the plunger 38 toward the stop 43. The force of this pull on the plunger 38 is opposed by a helical spring 52 mounted around the plunger 38. The respective ends of the spring 52 bear against an end wall of the housing 39 and against a washer 53 carried on the stud 46 and secured by a pair of lock nuts 54. After initially positioning the member 17 on the stud 46 and locking the same in such position by means of the lock nuts 48, the position of the contact-carrying members 17 and 26 with respect to the actuating member 35 can readily be controlled by varying the current supplied to the solenoid 37. Thus, when the pull on the plunger 38 is decreased by decreasing the value of current supplied to the solenoid 37, the tension of the spring 52 draws the plunger 39 in a direction away from the stop 43 until the tension of the spring counter-balances the pull produced by the solenoid 37. Conversely, when the value of current supplied to the solenoid 37 is increased, the plunger 38 is drawn toward the stop 43 until the pull produced by the solenoid is counter-balanced by the tension of the spring.

Referring to Fig. 3, the motor M is diagrammatically illustrated as a single phase series type commutator motor having an armature 55, and series and compensating field windings 56 and 57, respectively. The terminals 58 of the motor M are arranged to be connected through conductors 29 to an alternating current distribution circuit 59 by means of a switch 60.

In this embodiment of my invention the normally closed contacts 14 and 15 are connected by conductor 29 in series with the armature 55 and field windings 56 and 57, and are adapted to open the motor circuit when the motor exceeds a predetermined rate of speed. This disconnects the motor M from the distribution circuit 59; and subsequently, after the motor is again operating at the predetermined speed, the contacts 14 and 15 assume their normally closed position to permit current to be supplied from the distribution circuit 59 to the motor M. It will be noted that the electromagnetic control circuit is connected in the electric circuit in parallel with the line current to the motor.

The electromagnetic device E for adjusting the position of the contacts 14 and 15 with respect to the axially movable member 35 is preferably connected to a source of direct current. This may be accomplished by connecting the terminals 40 and 41 of the solenoid to the terminals 60 and 61 of a full wave rectifier unit comprising four dry plate rectifiers 62,—such as copper-oxide rectifiers for example,—connected in series in a closed loop to form a "Graetz bridge". The alternating current terminals 63 and 64 of the rectifier unit are connected to the secondary winding 65 of a transformer 66, the primary winding 67 of which is connected across the conductors 29. In this manner direct current for energizing the solenoid 37 may be obtained from the alternating current distribution circuit 59. A rheostat 68 is connected in series with the solenoid 37 for varying the magnitude of current supplied thereto. The rheostat 68 may be provided with a suitable scale 69 calibrated to indicate motor speed.

It is believed that the operation of my improved speed regulator will be readily understood from the foregoing description. By providing the electromagnetic device E and variable resistance 68 to regulate the position of the contact-carrying members 17 and 26 within the path of travel of the axially-movable actuating member 35, the predetermined motor speed at which the contacts 14 and 15 are caused to separate by the member 35 can be effectively controlled from a distance. This is particularly desirable in cases where the motor speed must be changed frequently, and the operator must maintain a position at a distance from the motor. Further, by providing a calibrated scale 69 on the adjustable resistor 68 to indicate the speed of the motor, the operator can easily and quickly adjust the speed at which it is desired to operate the motor M.

Although I have shown but one form of my improved speed regulator, in connection with an alternating current motor, I do not desire my invention to be limited to the particular arrangement set forth, and I intend in the appended claims to cover all modifications within the spirit and scope of my invention.

I claim:

1. A machine having a rotatable shaft, and means for variably controlling the speed of the shaft, comprising an electric circuit, a pair of cooperating contact members connected in series relation in said circuit for opening and closing the same to change the condition thereof, at least one of said contact members being movable, means including a centrifugal governor cooperating with said movable contact member and adapted to be driven by said shaft for varying the relative position of said contact members to change the condition of said circuit when said shaft exceeds a predetermined value of speed, and manually-operable electromagnetic means associated with said movable contact member for changing the predetermined value of shaft speed at which the relative position of said contact members varies to change the condition of said circuit.

2. A machine having a rotatable shaft, and means for variably controlling the speed thereof, comprising an electric circuit, a pair of cooperating contact members connected in series relation in said circuit for opening and closing the same to change the condition thereof, at least one of said contacts being movable, means including a centrifugal governor cooperating with said movable contact member and adapted to be driven by said shaft for varying the relative position of said contact members to change the condition of said circuit when said shaft exceeds a predetermined speed, and means including a stationary electromagnetic device operatively connected to said movable contact member for varying the shaft speed to that at which the relative position of said contact members varies to change the condition of said circuit.

3. An electric motor having a rotatable member including a shaft, and means for variably controlling the speed thereof, comprising an electric circuit, a pair of cooperating contact members connected in series relation in said circuit for opening and closing the same to change the condition thereof, at least one of said members being movable, means including a centrifugal governor cooperating with said movable contact member and carried by said shaft at one end thereof for varying the relative position of said contact members to change the condition of said circuit when said shaft exceeds a predetermined speed, a solenoid having a movable core operatively connected to said movable contact member for changing the shaft speed at which the relative position of said contact members produces a change in the condition of said circuit, and manually operable means for controlling the value of current supplied to said solenoid.

4. A machine having a rotatable shaft, and means for variably controlling the speed thereof, comprising an electric circuit, a pair of cooperating contact members connected in series relation in said circuit for opening and closing the same to change the condition thereof, one of said contact members being flexibly mounted, a centrifugal governor carried by said shaft at one end thereof and having secured thereto a member axially-movable under the influence of centrifugal force, said axially-movable member being adapted to cooperate with and cause the flexibly-mounted contact member to move and vary the relative position of said contact members to change the condition of said circuit when said shaft exceeds a predetermined value of speed, and electromagnetic means for changing the position of said flexibly mounted contact member with respect to said axially-movable member for regulating the predetermined value of shaft speed at which the relative position of said contact members varies to change the condition of said circuit.

5. A machine having a rotatable shaft, and means for controlling the speed thereof comprising an electric circuit having therein a pair of normally-closed cooperating contacts, members for carrying said contacts, one of said contact-carrying members being flexibly mounted, a centrifugal governor adjacent to said contact-carrying members and carried by said shaft at one end thereof, means carried by said governor and axially-movable by the centrifugal force produced thereby for moving said flexibly-mounted contact-carrying member in a direction away from the other to separate said contacts and open said circuit when said shaft exceeds a predetermined speed, and means including an electromagnetic device operatively connected to said flexibly-mounted contact-carrying member for changing the axial position thereof for regulating the shaft speed at which said flexibly mounted contact-carrying member moves to separate said contacts.

6. An electric motor having a rotatable member including a shaft, and means for controlling the speed thereof comprising a pair of cooperating contact members connected in series relation in an electric circuit for opening and closing the same, said contact members being disposed adjacent one end of said shaft, one of said contact members being pivotally movable about an axis transverse to the axis of said shaft, a centrifugal governor carried by said shaft and including an actuating member disposed adjacent to said contact-carrying members, said actuating member being axially movable under the influence of the centrifugal force produced by said governor and cooperating with said movable contact member for varying the relative position of said contact members, and means including an electromagnetic device adapted to be operatively connected to said movable contact member for effecting pivotal movement of the latter.

7. A machine having a rotatable member including a shaft and means for controlling the speed thereof, comprising an electric circuit, a contact member disposed at one end of said shaft and mounted for movement about an axis transverse to the axis of said shaft, a second contact member flexibly mounted on said first-mentioned contact member and insulated therefrom, said second-mentioned contact member cooperating with said first-mentioned contact member and movable about an axis transverse to the axis of said shaft, said cooperating contact members being connected in series relation in said circuit for opening and closing the same to change the condition thereof, means including a centrifugal governor carried at one end of said shaft adjacent to said contact members for varying the relative position of said contact members to change the condition of said circuit when said shaft exceeds a predetermined speed, and means cooperating with said first-mentioned contact member for regulating the shaft speed at which the relative position of said contact members is such as to change the condition of said circuit.

8. A machine having a rotatable shaft, and means for controlling the speed thereof, comprising an electric circuit, a pair of cooperating contacts connected in series relation in said circuit for opening and closing the same to change the condition thereof; members for carrying said contacts movable in the same plane, one of said contact members being flexibly mounted on said other contact member and being insulated therefrom, means including a centrifugal governor cooperating with said flexibly mounted contact member and adapted to be driven by said shaft for varying the relative position of said contacts to change the condition of said circuit when said shaft exceeds a predetermined speed, and means including an electromagnetic device cooperating with said contact members for regulating the predetermined shaft speed at which the relative position of said contacts effects the said change in the condition of said circuit.

9. A machine having a rotatable shaft and means for controlling the speed thereof, comprising an electric circuit, a pair of cooperating contact members connected in series relation in said circuit for opening and closing the same to change the condition thereof, at least one of said contact members being movable, means responsive to the speed of said shaft for varying the relative position of said contact members to change the condition of said circuit when said shaft exceeds a predetermined speed, and means including an electromagnetic device for varying the predetermined shaft speed at which the relative spacing of said contact members effects the said change in the condition of said circuit, said electromagnetic device comprising a solenoid adapted to be connected to a source of electric current, a tapered plunger movable in said solenoid and operatively connected to said movable contact member, and resilient means arranged to oppose the pull of said solenoid on said plunger.

10. A machine having a rotatable shaft and means for controlling the speed thereof, comprising an electric circuit, a pair of cooperating contacts connected in series relation in said circuit, members for carrying said contacts movable in the same plane, one of said contact members being resiliently mounted on said other contact member and insulated therefrom, means responsive to the speed of said shaft and cooperating with said resiliently-mounted contact member for adjusting the relative position of said contacts, a solenoid connected to a source of electric current, a plunger movable in said solenoid and operatively connected to said movable contact member on which said other contact member is resiliently mounted, and means for regulating the value of electric current supplied to said solenoid.

11. In combination, a motor adapted to be connected with a source of alternating current and having a rotatable member including a shaft, a pair of normally-closed cooperating contacts connected in series relation with said source of current, means responsive to the speed of said shaft for separating said contacts when the shaft speed exceeds a predetermined value, and electromagnetic means for moving said contacts with respect to said speed responsive means thereby regulating the shaft speed at which said contacts are caused to separate.

12. In combination, a motor adapted to be connected with a source of alternating current, and having a rotatable member including a shaft, an electric circuit that includes the motor and said source, a pair of normally-closed cooperating contact members connected in series relation in said circuit, means responsive to the speed of said shaft for separating said contacts when the speed thereof exceeds a predetermined value, a solenoid having a tapered, movable core therein operatively connected with said contact members, rectifying means connecting said alternating current source and said solenoid for supplying direct current to the latter, and means including a variable resistance connected in series with said solenoid and said current source for controlling the value of current supplied to said solenoid and for regulating the shaft speed rate at which said contacts separate.

13. The combination of a machine having a rotatable shaft, an electric circuit associated therewith, a pair of cooperating contacts connected in series relation in said circuit for opening and closing the same to change the condition thereof, at least one of said contacts being movable, means cooperating with said movable contact and responsive to the speed of said shaft for varying the relative position of said contacts to change the condition of said circuit when said shaft exceeds a predetermined speed, and electromagnetic means associated with both of said contacts and having a variable resistance provided with a scale calibrated to indicate shaft speed for changing the shaft speed at which the relative position of said contacts varies to change the condition of said circuit.

14. The combination with an electric motor having a rotatable member including a shaft, an electric circuit associated with the motor, a pair of cooperating contact members movable in the same plane and connected in series relation in said circuit for opening and closing the same to change the condition thereof, means including a centrifugal governor cooperating with one of said contact members and adapted to be driven by said shaft for varying the relative position of said contact members to change the condition of said circuit when said shaft exceeds a predetermined speed, a solenoid having a movable core therein operatively connected to said contact members, means for energizing said solenoid, yielding means connected with the core for resisting movement thereof under action of the solenoid, and an adjustable resistor connected in series with said solenoid and provided with a scale calibrated in terms of motor shaft speed for regulating the speed at which said centrifugal governor means causes the relative position of the contact members to be varied to change the condition of said circuit.

15. An electrical motor having a rotatable shaft, and means for controlling the speed thereof, comprising an electric circuit, a pair of cooperating contact members connected in series in said circuit for opening and closing the same to change the condition thereof, at least one of said members being movable, means including a centrifugal governor cooperating with said movable contact member and carried by said shaft at one end thereof for varying the relative position of said contact members to change the condition of said circuit when said shaft exceeds a predetermined speed, a solenoid having a movable core operatively connected to said movable contact member for regulating the shaft speed at which the relative position of said contact members produces change in the condition of said circuit, and yielding means resisting movement of the core in one direction for regulating the magnetic force required to produce the said change in the condition of the motor-operating circuit.

16. In a speed regulator of the character described, the combination of a rotating member, a motor-speed influenced governor carried on said shaft and including an axially-movable actuator beyond the end of said shaft, a pair of contact-carrying members normally spaced from said actuator and in its path of movement, said contact-carrying members forming a circuit closer connected in series with the said motor, magnetic means for adjusting the spacing between the said actuator and said contact-carrying members, means for selectively varying the actuating force developed by the magnetic means, and regulatable yielding means adapted to oppose in preselected degree the actuating force of the magnetic means.

17. A machine having a rotatable shaft, means for rotating the latter, and means for controlling the speed of the shaft, comprising an electric circuit, a pair of cooperating contact members connected in series relation in said circuit for opening and closing the same, at least one of the said contact members being movable relative to the other, means including a centrifugal governor cooperating with said movable contact member and adapted to be driven by said shaft for varying the relative position of the said contact members to change the condition of said circuit when said shaft exceeds a predetermined maximum speed, and adjustable electromagnetic means connected in the said electric circuit in parallel with the shaft-rotating means and associated with the said movable contact member for regulating the shaft speed at which the relative position of said contact members varies to change the condition of the circuit.

SAMUEL R. OLDHAM.